(12) United States Patent
Johnson et al.

(10) Patent No.: US 7,332,002 B2
(45) Date of Patent: Feb. 19, 2008

(54) LOW SULFUR COAL ADDITIVE FOR IMPROVED FURNACE OPERATION

(75) Inventors: Stephen Allen Johnson, Windham, NH (US); John Wurster, Evergreen, CO (US); John Philip Comer, Manchester, NH (US)

(73) Assignee: ADA Environmental Solutions, LLC, Littleton, CO (US)

( * ) Notice: Subject to any disclaimer, the term of this patent is extended or adjusted under 35 U.S.C. 154(b) by 0 days.

(21) Appl. No.: 10/209,083

(22) Filed: Jul. 30, 2002

(65) Prior Publication Data

US 2002/0184817 A1 Dec. 12, 2002

Related U.S. Application Data

(62) Division of application No. 09/893,079, filed on Jun. 26, 2001, now Pat. No. 6,729,248.
(60) Provisional application No. 60/213,915, filed on Jun. 26, 2000.

(51) Int. Cl.
  *C10L 1/10* (2006.01)
  *C10L 1/12* (2006.01)
  *C10L 7/00* (2006.01)

(52) U.S. Cl. ............................ 44/457; 44/457; 44/321; 44/603; 44/620

(58) Field of Classification Search .................. 44/457, 44/321, 603, 620
See application file for complete search history.

(56) References Cited

U.S. PATENT DOCUMENTS 1,955,574 A    4/1934   Benner et al.
2,844,112 A    7/1958   Muller .......................... 110/1

(Continued)

FOREIGN PATENT DOCUMENTS

| CN | 1052838 | * | 7/1991 |
| EP | 0 433 674 | | 11/1990 |
| FR | 1394847 | * | 4/1965 |
| JP | 11-94234 | | 4/1999 |
| WO | WO 86/04602 | | 8/1986 |
| WO | WO 91/09977 | | 7/1991 |

OTHER PUBLICATIONS

Aldrich Chemical catalog. pp. 863–866. 1996.*
"Chapter 15: Fuel–ash Effects on Boiler Design and Operation"; *Steam by The Babcock and Wilcox Company*; 1972; pp. 15-1 to 15-16.
Declaration of Richard Schlager; Sep. 18, 2002.
"Burning PRB Coals ADA Environmental Offers Flyash Solutions", Western Coal Advisory, Summer/Autumn 1999, 1 page.
"ADA–ES Tests New Boiler Product", Coal Daily, Apr. 18, 2000, 1 page.
Revised Declaration of Richard Schlager, Aug. 19, 2003.
Steam by The Babcock and Wilcox Company, "Chapter 15: Fuel–ash effects on boiler design and operation" (1972), pp. 15-1 to 15-26, Published in the U.S., date unknown.
U.S. Appl. No. 10/622,677, filed Jul. 18, 2003, Johnson et al.
"Iron–and Steelmaking" pp. 646–660; date unknown.

*Primary Examiner*—Cephia D. Toomer
(74) *Attorney, Agent, or Firm*—Sheridan Ross P.C.

(57) ABSTRACT

The present invention is directed to additives for coal-fired furnaces, particularly furnaces using a layer of slag to capture coal particles for combustion. The additive(s) include iron, mineralizer(s), handling aid(s), flow aid(s), and/or abrasive material(s). The iron and mineralizers can lower the melting temperature of ash in low-iron, high alkali coals, leading to improved furnace performance.

85 Claims, 7 Drawing Sheets

U.S. PATENT DOCUMENTS

| | | | |
|---|---|---|---|
| 3,004,836 A | 10/1961 | Thompson | 44/4 |
| 3,332,755 A * | 7/1967 | Kukin | 44/603 |
| 3,823,676 A | 7/1974 | Cook et al. | 110/1 J |
| 3,947,354 A | 3/1976 | Swanson et al. | 210/53 |
| 3,970,434 A | 7/1976 | Gasior et al. | 44/1 |
| 4,051,316 A | 9/1977 | Wing et al. | 536/107 |
| 4,057,398 A | 11/1977 | Bennett | 44/4 |
| 4,083,783 A | 4/1978 | Wing et al. | 210/54 |
| 4,173,454 A | 11/1979 | Heins | 44/1 SR |
| 4,230,460 A | 10/1980 | Maust, Jr. | 44/16 |
| 4,238,329 A | 12/1980 | Zievers | 210/36 |
| 4,364,818 A | 12/1982 | Schmid et al. | 208/10 |
| 4,372,227 A | 2/1983 | Mahoney | 110/342 |
| 4,377,118 A * | 3/1983 | Sadowski | 110/343 |
| 4,385,891 A | 5/1983 | Ligotti | 433/92 |
| 4,438,709 A | 3/1984 | Borio | 110/347 |
| 4,498,402 A | 2/1985 | Kober et al. | |
| 4,514,256 A | 4/1985 | Kober et al. | 162/30.11 |
| 4,564,374 A | 1/1986 | Hofmann | 55/57 |
| 4,572,085 A * | 2/1986 | Hepworth | 110/345 |
| 4,577,566 A | 3/1986 | Merrell | 110/343 |
| 4,586,443 A | 5/1986 | Burge et al. | 110/347 |
| 4,598,652 A | 7/1986 | Hepworth | 110/345 |
| 4,668,429 A | 5/1987 | Najjar | 252/373 |
| 4,671,804 A | 6/1987 | Najjar | 48/197 R |
| 4,706,579 A | 11/1987 | Merrell | 110/343 |
| 4,741,278 A | 5/1988 | Franke et al. | 110/342 |
| 4,753,632 A | 6/1988 | Hofmann et al. | 494/43 |
| 4,765,258 A | 8/1988 | Zauderer | 110/347 |
| 4,784,670 A | 11/1988 | Najjar | 48/197 R |
| 4,796,548 A | 1/1989 | Merrell et al. | 110/343 |
| 4,831,942 A | 5/1989 | Morimoto et al. | 110/345 |
| 4,843,980 A | 7/1989 | Markham et al. | 110/342 |
| 4,886,521 A | 12/1989 | Khan | 44/607 |
| 4,919,826 A | 4/1990 | Alzner | 210/788 |
| 5,001,994 A | 3/1991 | Morimoto et al. | 110/342 |
| 5,017,135 A | 5/1991 | Meyer | 433/92 |
| 5,022,329 A | 6/1991 | Rackley | 110/237 |
| 5,052,312 A | 10/1991 | Rackley | 110/346 |
| 5,114,578 A | 5/1992 | Sundström | 210/256 |
| 5,196,648 A | 3/1993 | Jones | 102/307 |
| 5,207,164 A | 5/1993 | Breen et al. | 110/345 |
| 5,282,430 A | 2/1994 | Nehls, Jr. | 110/345 |
| 5,307,743 A | 5/1994 | Jones | 102/307 |
| 5,320,051 A | 6/1994 | Nehls, Jr. | 110/345 |
| 5,324,336 A | 6/1994 | Child | 44/608 |
| 5,333,558 A | 8/1994 | Lees, Jr. | 110/346 |
| 5,357,002 A | 10/1994 | Lezzi et al. | 525/332.2 |
| 5,364,421 A | 11/1994 | Westby | 44/608 |
| 5,577,910 A | 11/1996 | Holland | 433/92 |
| 5,613,851 A | 3/1997 | Trawöger et al. | 433/92 |
| 5,658,487 A | 8/1997 | Carey et al. | 252/180 |
| 5,679,259 A | 10/1997 | Bolser | 210/719 |
| 5,741,397 A | 4/1998 | Kraver | 159/25.2 |
| 5,795,159 A | 8/1998 | Ralls et al. | 433/92 |
| 5,797,742 A | 8/1998 | Fraker | 433/92 |
| 5,819,672 A | 10/1998 | Radway et al. | 110/344 |
| 5,855,649 A | 1/1999 | Durham | 95/71 |
| 5,885,076 A | 3/1999 | Ralls et al. | 433/92 |
| 5,888,256 A | 3/1999 | Morrison | 44/552 |
| 5,893,943 A | 4/1999 | Durham | 95/65 |
| 5,894,806 A | 4/1999 | Smyrniotis et al. | 110/343 |
| 5,899,678 A | 5/1999 | Thomson et al. | 431/2 |
| 5,972,066 A | 10/1999 | Lehtinen | 75/10.63 |
| 6,022,216 A | 2/2000 | Cattani | 433/92 |
| 6,083,306 A | 7/2000 | Cattani | 96/157 |
| 6,139,751 A | 10/2000 | Bogaert et al. | 210/679 |
| 6,165,366 A | 12/2000 | Sarangapani | 210/666 |
| 6,206,685 B1 | 3/2001 | Zamansky et al. | |
| 6,221,001 B1 | 4/2001 | Comer | 588/252 |
| 6,258,456 B1 | 7/2001 | Meyer | 428/403 |
| 6,267,802 B1 | 7/2001 | Baldrey | 95/58 |
| 6,471,506 B1 | 10/2002 | Zamansky et al. | |
| 6,484,651 B1 | 11/2002 | Shepard, Jr. et al. | 110/342 |
| 2002/0066394 A1 | 6/2002 | Johnson et al. | 110/342 |
| 2002/0088170 A1 | 7/2002 | Sanyal | 44/627 |
| 2003/0027014 A1 | 2/2003 | Johnson et al. | 428/688 |

* cited by examiner

LOW SULFUR COAL ADDITIVE FOR IMPROVED FURNACE OPERATION

CROSS REFERENCE TO RELATED APPLICATIONS

The present application is a divisional of U.S. patent application Ser. No. 09/893,079 now U.S. Pat. No. 6,729,248, filed Jun. 26, 2001, entitled "LOW SULFUR COAL ADDITIVE FOR IMPROVED FURNACE OPERATION", which claims the benefits of U.S. Provisional Application Ser. No. 60/213,915, filed Jun. 26, 2000, and entitled "Low-Cost Technology to Improve Operation of Cyclone Furnaces Firing Low-Sulfur Western Coals", each of which is incorporated herein by reference in its entirety.

FIELD OF THE INVENTION

The present invention relates generally to coal additives for furnaces and specifically to coal additives for slag-type furnaces.

BACKGROUND OF THE INVENTION

Coal is widely recognized as an inexpensive energy source for utilities. Coal-fired furnaces are used to generate steam for power production and industrial processes. Coal-fired furnaces have many different configurations and typically include a plurality of combustors. In one furnace configuration, a slag layer forms on a surface of the burner and captures the coal particles for combustion. Such a furnace will be hereafter referred to as a "slag type furnace."

An example of a combustor 100 for a slag-type furnace is depicted in FIG. 1. The depicted combustor design is used in a cyclone furnace of the type manufactured by Babcock and Wilcox. Cyclone furnaces operate by maintaining a sticky or viscous layer of liquid (melted) ash (or slag) (not shown) on the inside cylindrical walls 104 of the cyclone combustion chamber 108. Coal is finely crushed (e.g., to minus ¼ inch top size), entrained in an airstream, and blown into the combustor end 112 of the cyclone combustor or combustor 100 through coal inlet 116. Combustion air (shown as primary air 120, secondary air 124, and tertiary air 128) is injected into the combustion chamber 108 to aide in combustion of the coal. The whirling motion of the combustion air (hence the name "cyclone") in the chamber 108 propels the coal forward toward the furnace walls 104 where the coal is trapped and burns in a layer of slag (not shown) coating the walls. The re-entrant throat 140 (which restricts escape of the slag from the chamber 108 via slag tap opening 144) ensures that the coal particles have a sufficient residence time in the chamber 108 for complete combustion. The slag and other combustion products exit the chamber 108 through the slag tap opening 144 at the opposite end from where the coal was introduced. The molten slag (not shown) removed from the chamber 108 flows to a hole (not shown) in the bottom of the boiler where the slag is water-quenched and recovered as a saleable byproduct. The ash composition is important to prevent the slag from freezing in the hole and causing pluggage. To melt ash into slag at normal combustion temperatures (e.g., from about 2600 to about 3000° F.), slag-type furnaces, such as cyclones, are designed to burn coals whose ash contains high amounts of iron and low amounts of alkali and alkaline earth metals (as can be seen from FIG. 2). Iron both reduces the melting temperature of the ash and increases the slag viscosity at these temperatures due to the presence of iron aluminosilicate crystals in the melt.

High sulfur content in coal, particularly coals from the eastern United States, has allegedly caused significant environmental damage due to the formation of sulfur dioxide gas. As a result, utilities are turning to low sulfur western coals, particularly coals from the Powder River Basin, as a primary feed material. As used herein, "high sulfur coals" refer to coals having a total sulfur content of at least about 1.5 wt. % (dry basis of the coal) while "low sulfur coals" refer to coals having a total sulfur content of less than about 1.5 wt. % (dry basis of the coal) and "high iron coals" refer to coals having a total iron content of at least about 10 wt. % (dry basis of the ash) while "low iron coals" refer to coals having a total iron content of less than about 10 wt. % (dry basis of the ash). As will be appreciated, iron and sulfur are typically present in coal in the form of ferrous or ferric carbonites and/or sulfides, such as iron pyrite.

The transition from high sulfur (and high iron) to low sulfur (and low iron) coals has created many problems for slag-type coal furnaces such as cyclone furnaces. When low-sulfur western coals, with low iron and high (i.e., at least about 20 wt. % (dry basis of the ash)) alkali (e.g., calcium) contents, are fired in these boilers, the viscosity of the slag is too low, causing less retained bottom ash (or a higher amount of entrained coal and ash particulates in the offgas from combustion), degraded performance of particulate collectors (due to the increased particulate load) and therefore a higher incidence of stack opacity violations and increased fuel and maintenance costs, less reliable slag tapping, the occurrence of flames in the main furnace, high furnace exit temperatures (or sprays), and increased convective pass fouling. As shown in FIG. 3, in the operating range noted above high sulfur coals (denoted as Illinois coal) form slag having a moderate to high viscosity and therefore produce a relatively thick slag layer on the surface of the furnace while low sulfur coals (denoted as PRB coals) form a slag having a very low viscosity and therefore produce thin, low viscosity slag layers. As a result, utilities using slag-type furnaces, such as cyclone furnaces, have, through switching feed materials, realized lower sulfur dioxide emissions but at the same time have produced a host of new operational problems.

Techniques that have been employed to provide improved slag characteristics for high sulfur eastern coals have proven largely ineffective for low sulfur coals. For example, limestone has been used by utilities as a high sulfur coal additive to adjust the slag viscosity to the desired range for the furnace operating temperature. The calcium in the limestone is widely believed to be the primary reason for the improved performance. Low sulfur western coals, in contrast, already have relatively high calcium contents and therefore experience little, if any, viscosity adjustment when limestone is added to the coal feed to the furnace.

Another possible solution is the addition of iron pellets (which typically include at least predominantly nonoxidized iron) to the furnace to assist in slag formation and coal combustion. Iron oxide fluxes high-silica glass, while reduced forms of iron (FeO or Fe-metal) flux calcium-rich glass. In the presence of burning coal particles, iron exists primary in reduced form. The use of iron has been recommended to solve slag-tapping problems in cyclone furnaces by adding commercially available iron pellets, which are very expensive. The pellets have a further disadvantage of forming pools of reduced iron that can be very corrosive to metal or refractory surfaces exposed to the iron and/or of being an ineffective fluxing agent. Therefore, iron fluxes have failed to achieve long term acceptance in the utility industry.

Another possible solution is to blend high iron coals with the western coals to increase the iron content of the coal feed. Blended coals are far from a perfect solution. High iron coals (or "kicker" coals) are often much more expensive coals than western coals. High iron coals also have high sulfur levels because the predominant form of iron in such coals is iron sulfide (or iron pyrite). Blended coals suffer from increased operating costs and increased sulfur dioxide emissions, which can in certain cases exceed applicable regulations.

Another possible solution is to grind the coal going into the cyclone furnace much finer and supply additional air to increase the percentage of combustion that occurs for coal particles in flight. This option requires expensive modifications or replacement of grinding equipment and is counter to the original design and intent of the cyclone furnace. The technique further decreases boiler efficiency and increases the auxiliary power required to operate the boiler. The use of fine grinding has thus proven to be an inadequate solution to the problem in most cases.

SUMMARY OF THE INVENTION

The various methods and compositions of the present invention can provide a fluxing agent or additive that can be contacted with the coal feed to or in a combustion chamber of a furnace to produce a slag layer having one or more desirable characteristics, such as viscosity and thickness. The methods and compositions are particularly effective for a cyclone furnace of the type illustrated in FIG. 1.

In one embodiment, a method is provided for combusting coal that includes the steps of:

(a) providing a coal-containing feed material to a coal combustion chamber;

(b) contacting the feed material with an iron-containing additive; and (c) melting at least a portion of the coal-containing feed material and iron-containing additive to form a slag layer on at least a portion of a surface of the combustion chamber, whereby coal in the coal-containing feed material is captured by the slag layer and combusted. As noted below, the additive permits slag-type furnaces to burn low iron, high alkali, and low sulfur coals by enhancing the slagging characteristics of the ash.

The coal-containing feed material has coal as the primary component. As used herein, "coal" refers to macromolecular network comprised of groups of polynuclear aromatic rings, to which are attached subordinate rings connected by oxygen, sulfur and aliphatic bridges. Coal comes in various grades including peat, lignite, sub-bituminous coal and bituminous coal. In one process configuration, the coal includes less than about 1.5 wt. % (dry basis of the coal) sulfur while the coal ash contains less than about 10 wt. % (dry basis of the ash) iron as $Fe_2O_3$, and at least about 15 wt. % calcium as CaO (dry basis of the ash). The material is preferably in the form of a free flowing particulate having a $P_{90}$ size of no more than about 0.25 inch.

The coal combustion chamber is part of a coal-fired furnace. The furnace can be of any configuration, with a slag-type furnace being preferred and a cyclone furnace being even more preferred.

The iron-containing additive can be in any form and any composition so long as iron is present in sufficient amounts to flux effectively the feed material. The iron can be present in any form(s) that fluxes under the conditions of the furnace, including in the forms of ferrous or ferric oxides and sulfides. In one formulation, iron is present in the form of both ferric and ferrous iron, with ferric and ferrous iron oxides being preferred. Preferably, the ratio of ferric (or higher valence) iron to ferrous (or lower valence) iron is less than 2:1 and more preferably ranges from about 0.1:1 to about 1.95:1, or more preferably at least about 33.5% of the iron in the additive is in the form of ferrous (or lower valence) iron and no more than about 66.5% of the iron in the additive is in the form of ferric (or higher valence) iron. In a particularly preferred formulation, at least about 10% of the iron in the additive is in the form of wustite. "Wustite" refers to the oxide of iron of low valence which exist over a wide range of compositions (e.g., that may include the stoichiometric composition FeO) as compared to "magnetite" which refers to the oxide of iron of intermediate or high valence which has a stoichiometric composition of $Fe_2O_3$ (or $FeO.Fe_2O_3$). It has been discovered that the additive is particularly effective when wustite is present in the additive. While not wishing to be bound by any theory, it is believed that the presence of iron of low valence levels (e.g., having a valence of 2 or less) in oxide form may be the reason for the surprising and unexpected effectiveness of this additive composition.

While not wishing to be bound by any theory, it is believed that the presence of iron in the calcium aluminosilicate slags of western coals causes a decrease in the melting temperature of the ash and crystal formation in the melt when a critical temperature ($T_{cv}$) is reached. These crystals change the flow characteristics of the slag causing the slag to thicken before the slag can flow. This phenomenon is known as "yield stress" and is familiar to those skilled in the art of non-Newtonian flow. Thicker slag allows the slag to capture and hold more coal particles. Therefore, fewer coal particles escape the combustor without being burned.

In a preferred process configuration, the additive is in the form of a free-flowing particulate having a $P_{90}$ size of no more than about 300 microns (0.01 inch) and includes at least about 50 wt. % iron. Compared to iron pellets, the relatively small particle size of the additive reduces significantly the likelihood of the formation of pools of reduced iron that can be very corrosive to metal or refractory surfaces exposed to the iron. It is believed that the reason for pooling and poor fluxing has been the relatively large sizes of iron pellets (typically the $P_{90}$ size of the pellets is at least about 0.25 inch (6350 microns)) in view of the short residence times of the pellets in the combustion chamber. Such pellets take longer to heat and therefore melt and act as a flux. This can cause the pellets to pass or tumble through the chamber before melting has fully occurred. The increase surface area of the additive further aids in more effective fluxing as more additive reaction surface is provided.

Preferably, the additive further includes a mineralizer, such as zinc oxide. While not wishing to be bound by any theory, it is believed that the zinc increases the rate at which iron fluxes with the coal ash. "Ash" refers to the residue remaining after complete combustion of the coal particles. Ash typically includes mineral matter (silica, alumina, iron oxide, etc.) Zinc is believed to act as a mineralizer. Mineralizers are substances that reduce the temperature at which a material sinters by forming solid solutions. This is especially important where, as here, the coal/ash residence time in the combustor is extremely short (typically less than about one second). Preferably, the additive includes at least about 1 wt. % (dry basis) mineralizer and more preferably, the additive includes from about 3 to about 5 wt. % (dry basis) mineralizer. Mineralizers other than zinc oxides include calcium, magnesium or manganese flourides or sulfites and other compounds known to those in the art of cement-making. Preferably, the additive includes no more than about 0.5 wt. % (dry basis) sulfur, more preferably includes no more than about 0.1 wt. % (dry basis) sulfur, and even more preferably is at least substantially free of sulfur.

The injection rate of the iron-containing additive to the chamber depends, of course, on the combustion conditions and the chemical composition of the coal feed and additive. Typically, the injection rate of the iron-containing additive into the combustion chamber ranges from about 10 to about 50 lb/ton coal and more typically from about 10 to about 20 lb/ton coal.

After combination with the additive, the coal-containing feed material typically includes:
  (a) coal; and
  (b) an additive that includes iron in an amount of at least about 0.5 wt. % (dry basis) and mineralizer in an amount of at least about 0.005 wt. % (dry basis).

The methods and additives of the present invention can have a number of advantages compared to conventional systems. The additive(s) can provide a slag layer in the furnace having the desired viscosity and thickness at a lower operation temperature. As a result, there is more bottom ash to sell, a relatively low flyash carbon content, more effective combustion of the coal, more reliable slag tapping, improved boiler heat transfer, and a relatively low amount of entrained particulates in the offgas from combustion, leading to little or no degradation in performance of particulate collectors (due to the increased particulate load). The boiler can operate at lower power loads (e.g., 60 MW without the additive and only 35 MW with the additive as set forth below) without freezing the slag tap and risking boiler shutdown. The operation of the boiler at a lower load (and more efficient units can operate at higher load) when the price of electricity is below the marginal cost of generating electricity, can save on fuel costs. The additive can reduce the occurrence of flames in the main furnace, lower furnace exit temperatures (or steam temperatures), and decrease the incidence of convective pass fouling compared to existing systems. The additive can have little, if any, sulfur, thereby not adversely impacting sulfur dioxide emissions. These and other advantages will become evident from the following discussion.

DETAILED DESCRIPTION

The Additive

Figure 1:
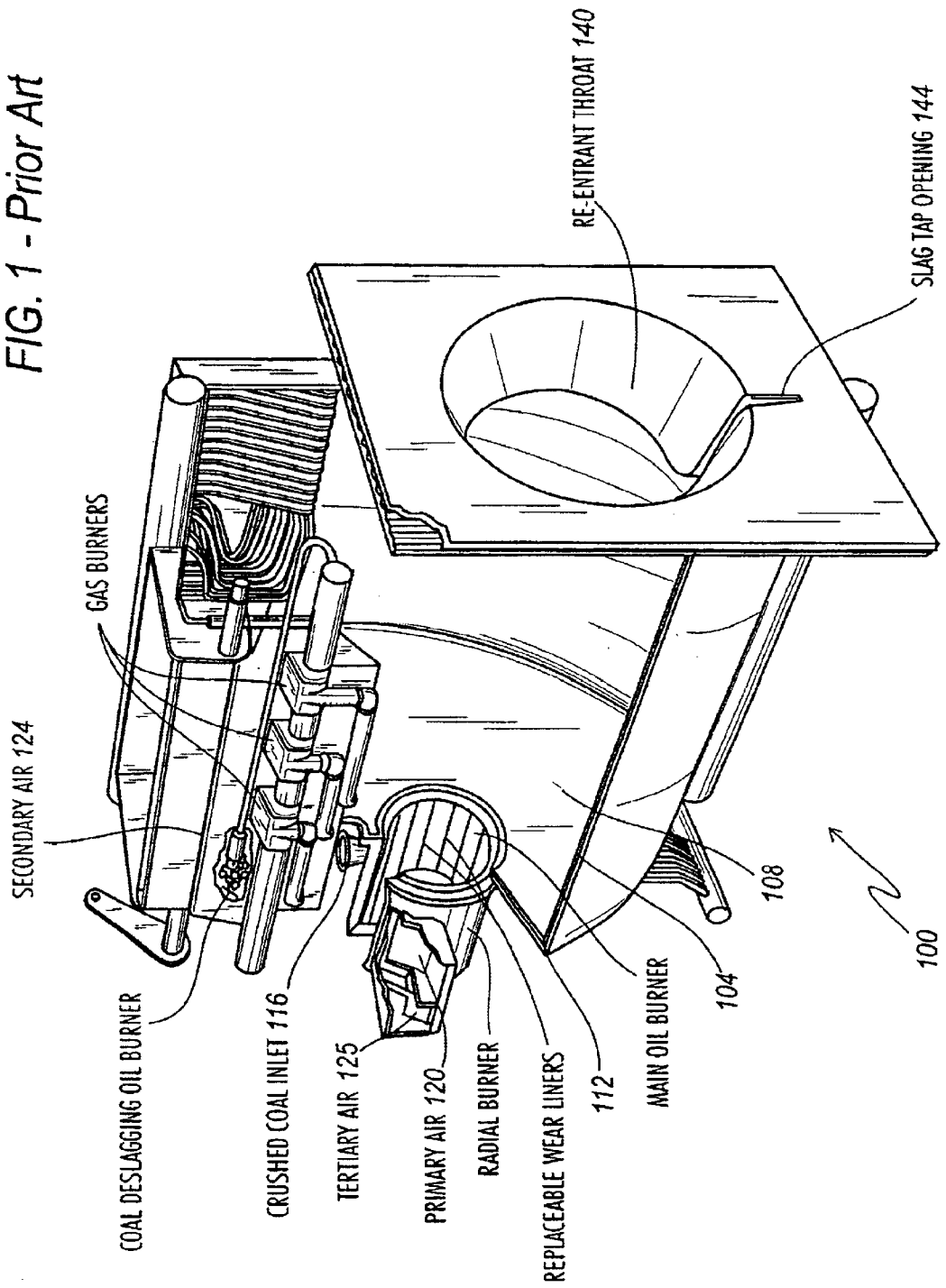
FIG. 1 is a cutaway view of a combustor of a cyclone furnace.
Figure 2:
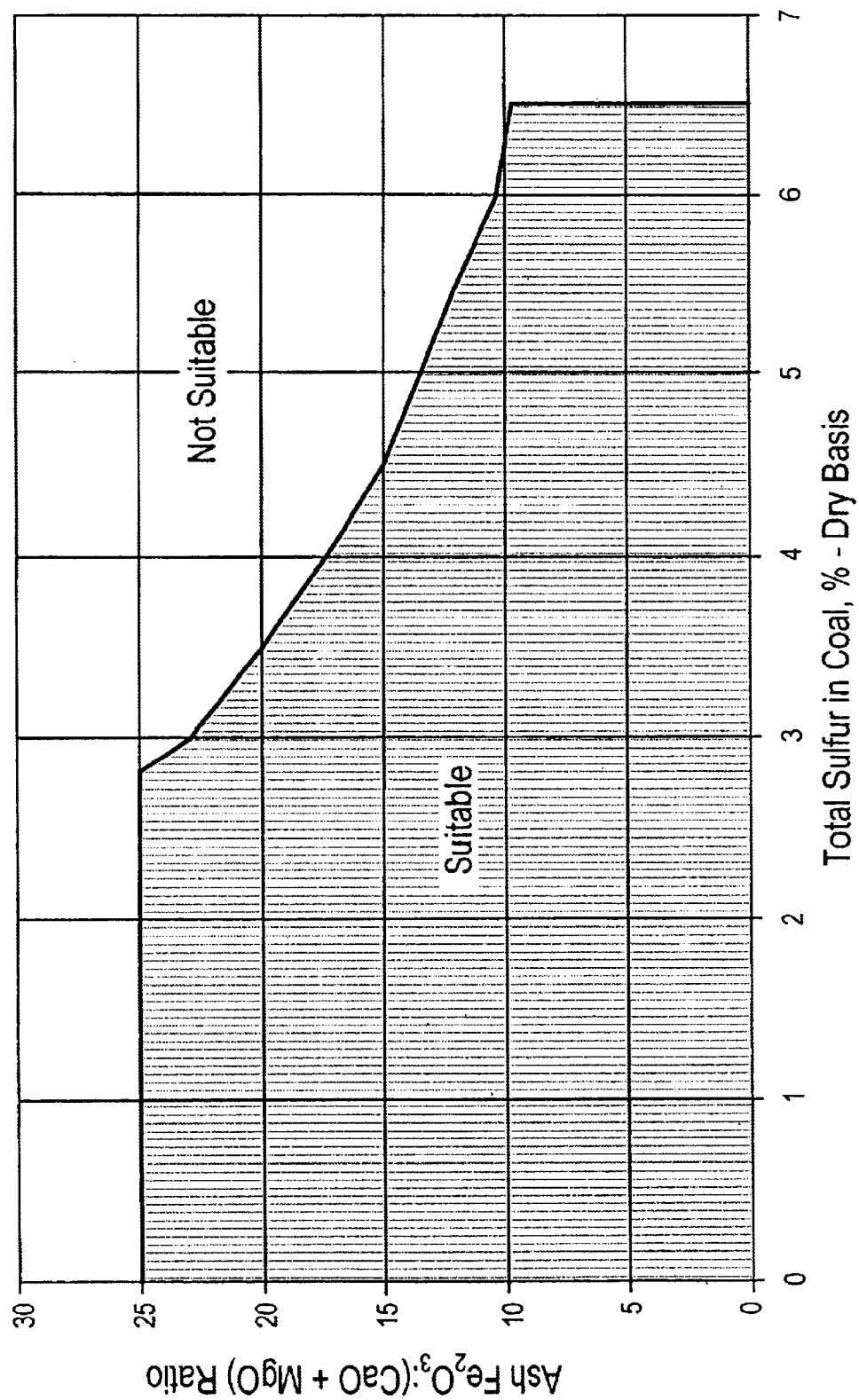
FIG. 2 is a graph of ash $Fe_2O_3$:(CaO+MgO) content ratio versus total sulfur in coal (wt percent—dry basis) showing coals suitable for a cyclone furnace.
Figure 3:
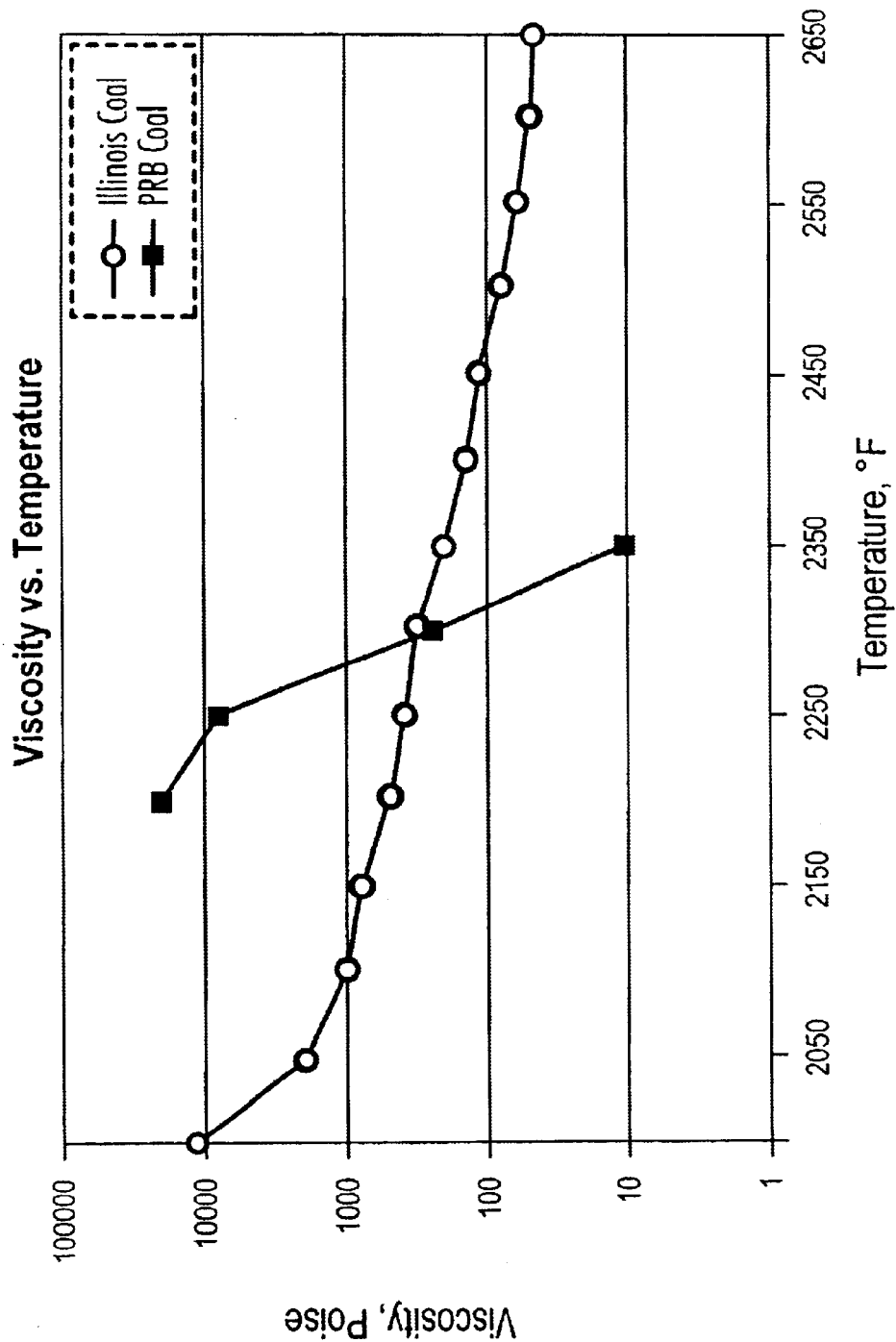
FIG. 3 is a graph plotting slag viscosity versus operating temperature for high and low sulfur coals.

As noted, the additive contains iron and preferably a mineralizing agent, such as zinc. The iron and mineralizing agent can be in any form, such as an oxide or sulfide, so long as the iron and mineralizing agent will be reactive under the operating conditions of the furnace. Preferably, the additive includes at least about 50 wt. % (dry basis) iron and more preferably at least about 80 wt. % (dry basis) iron and even more preferably from about 70 to about 90 wt. % (dry basis) iron. Preferably, the ratio of ferric (or higher valence) iron to ferrous (or lower valence) iron is less than 2:1 and even more preferably ranges from about 0.1:1 to about 1.9:1, or more preferably at least about 33.5% and even more preferably at least about 35% and even more preferably at least about 40% of the iron in the additive is in the form of ferrous (or lower valence) iron and no more than about 65% of the iron in the additive is in the form of ferric (or higher valence) iron. In a particularly preferred formulation, at least about 10%, more preferably at least about 15% of the iron is in the form of wustite, and even more preferably from about 15 to about 50% of the iron is in the form of wustite. Preferably, the additive includes at least about 0.1 wt. % (dry basis) mineralizing agent and more preferably from about 0.5 to about 15 wt. % (dry basis) mineralizing agent, even more preferably from about 2 to about 8 wt. % (dry basis), and even more preferably from about 3 to about 5 wt. % (dry basis) mineralizing agent. Due to the formation of sulfur oxides, the additive typically includes little, if any, sulfur.

The additive is preferably in the form of a free-flowing particulate and has a relatively fine particle size. Preferably, the $P_{90}$ size of the additive is no more than about 300 microns, more preferably no more than about 150 microns, and even more preferably no more than about 75 microns.

The additive can be manufactured by a number of processes. For example, the additive can be the particles removed by particulate collection systems (e.g., by electrostatic precipitators or baghouses) from offgases of steel or iron manufacturing. Preferably, the additive is the collected fines (flue dust and/or electrostatic precipitator dust) from the offgas(es) of a blast furnace or BOF. In such materials, the iron and mineralizer are typically present as oxides. The additive can also be a sludge containing iron plus oils and greases produced during metal finishing operations. Oils and greases have the advantages of preventing fugitive emissions during handling and shipping and replacing the heat input requirement from the coal in the boiler and thus reduce fuel costs for producing electricity. Typically, such additives will contain from about 0.1 to about 10 wt. % (dry basis) greases and oils. Another source of iron-containing material is red mud from the bauxite mining industry.

Transportation of the Additive

Because of the small size of much of the available byproduct material, handling and transportation of the material can result in high fugitive dust emissions. It is therefore desirable to treat the material to provide acceptable dusting characteristics. The treatment can take place at the source of the material, at a transportation terminal, or at the plant site. There are several different types of treatment including:

(i) Adding water, typically in a ratio of from about 100:1 to about 1000:1 parts material to part water, to the material. Adding water to the material forms a cohesive layer on the wetted surface after drying of the material, which will substantially eliminate fugitive emissions from the pile.

(ii) The hydrophilic nature of the iron materials also means that they can be mixed as a slurry and made into any form desirable for shipping. Briquettes of the material can be made to decrease dust emissions during handling.

(iii) Organic and/or inorganic adhesives can be added to the slurried material to increase the cohesiveness of the final material. Typically, such adhesives are added in the ratio of about 100:1 to about 1000:1 parts material to part adhesive. Laboratory tests have shown that xanthan gum and phosphoric acid lead to very cohesive agents.

(iv) Spraying with conventional dust suppression chemicals such as calcium lignosulfonate can treat the material to prevent handling problems. This material is commonly used to reduce coal dust emissions and can be applied at a range of concentrations of from about 1 to about 10 wt. % (dry basis) of the additive at a low cost.

Use of the Additive

The additive can be contacted with the coal feed in a number of different ways. For example, the additive can be mixed with the coal feed at a shipping terminal, added to the coal reclaim belt, added to the coal bunkers, and/or added to the coal feed and/or primary air streams using an eductor to aspirate the additive.

Figure 4:
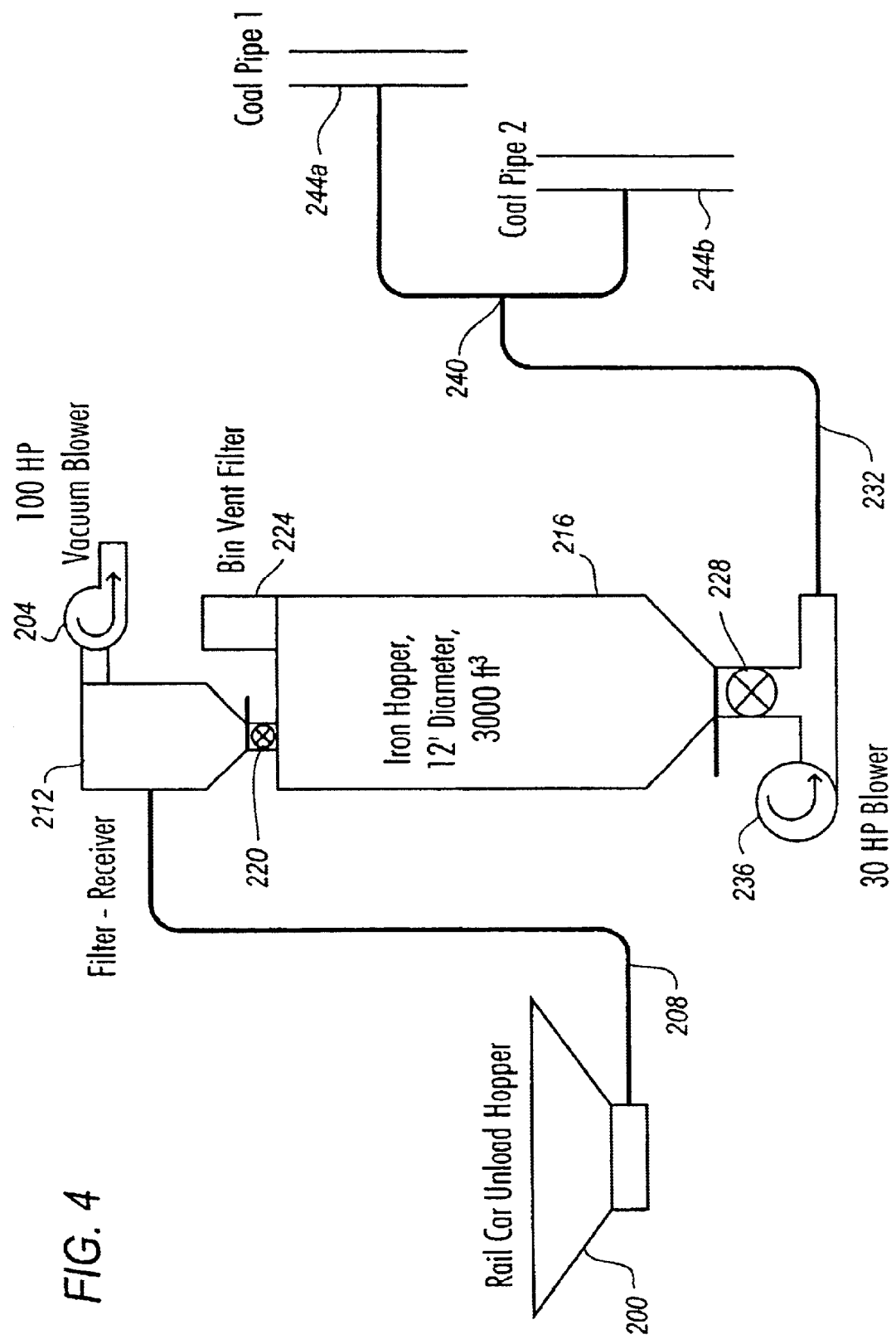
FIG. 4 is a first embodiment of a flow schematic of a process using an additive according to one embodiment of the present invention.

Referring to FIG. 4, a first method for adding the additive to the combustion process will be discussed. The additive is transported pneumatically from a hopper 200 of a covered railcar or truck using a vacuum blower 204 and transport line 208. The additive-containing gas stream passes through a filter receiver 212, which collects the additive as a retentate. The additive drops from the filter surface into the hopper 216 via duct 220. A bin vent filter 224 prevents pressure build up in the hopper 216 and accidental release of the additive from the hopper 216 into the ambient atmosphere. A metered valve 228 permits the additive to flow at a desired rate (typically from about 5 to about 2000 lb./min.) into a feed line 232, where the additive is combined with pressurized air (via blower 236). The additive is entrained in the air and transported through splitter 240 and to a number of coal feed pipes 244a,b. The additive/air stream is combined with the coal/air stream passing through the coal feed pipes 244a,b to form feed mixtures for the furnace. The feed mixtures 244a,b are then introduced into the combustors via coal inlet 116 (FIG. 1).

The additive can be highly cohesive and have a tendency to form dense, hard deposits in the above-noted delivery system. A flow aid and/or abrasive material can be added to the material to aid in its handling. As used herein, a "flow aid" refers to any substance that reduces particle-to-particle attraction or sticking, such as through electrostatic or mechanical means. Preferred flow aids include ethylene glycol, "GRIND AIDS" manufactured by WR Grace Inc. The preferred amount of flow aid in the additive is at least about 1 and no more than about 10 wt. % (dry basis) and more preferably at least about 1 and no more than about 5 wt. % (dry basis). Abrasive materials can also be used to prevent deposit formation and/or life. As will be appreciated, abrasive materials will remove deposits from the conduit walls through abrasion. Any abrasive material may be employed, with preferred materials being sand, blasting grit, and/or boiler slag. The preferred amount of abrasive material in the additive is at least about 2 and no more than about 20 wt. % (dry basis) and more preferably at least about 2 and no more than about 10 wt. % (dry basis).

Using the additive, the slag layer in the coal-burning furnace typically includes:

(a) at least about 5 wt. % (dry basis) coal;
(b) iron in an amount of at least about 15 wt. % (dry basis); and
(c) at least one mineralizer in an amount of at least about 1 wt. % (dry basis).

When the additive is employed, the slag layer in the combustor is in the form of a free-flowing liquid and typically has a viscosity of at least about 250 Poise.

Due to the presence of minerals in the feed material, the slag layer in the combustor can include other components. Examples include typically:

(d) from about 20 to about 35 wt. % (dry basis) silica oxides or $SiO_2$;
(e) from about 13 to about 20 wt. % (dry basis) aluminum oxides or $Al_2O_3$;
(f) from about 0 to about 2 wt. % (dry basis) titanium oxides or $TiO_2$;
(g) from about 18 to about 35 wt. % (dry basis) calcium oxides or CaO; and
(h) from about 3 to about 10 wt. % (dry basis) magnesium oxides or MgO.

The solid byproduct of the coal combustion process is typically more saleable than the byproduct in the absence of the additive. The solid byproduct is typically harder than the other byproduct and has a highly desirable composition. Typically, the byproduct includes:

(a) at least about 20 wt. % (dry basis) silica;
(b) iron in an amount of at least about 15 wt. % (dry basis);
(c) mineralizer in an amount of at least about 1 wt. % (dry basis); and
(d) at least about 13 wt % (dry basis) aluminum.

The byproduct can further include one or more of the compounds noted above.

Figure 5:
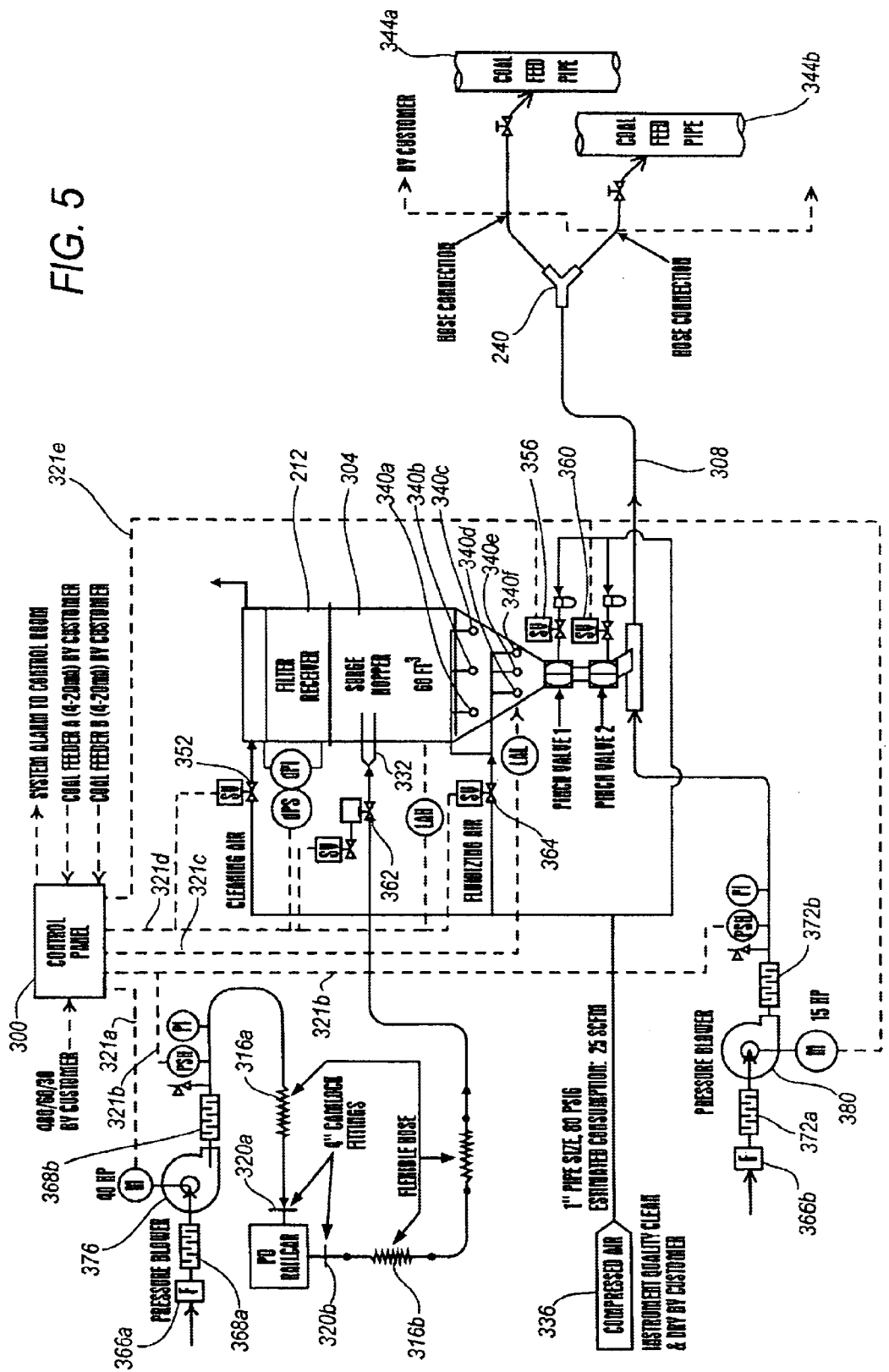
FIG. 5 is a second embodiment of a flow schematic of a process using an additive according to one embodiment of the present invention.

A second embodiment of a method for adding the additive to the combustion process is depicted in FIG. 5. Like reference numbers refer to the same components in FIG. 4. The process of FIG. 5 differs from the process of FIG. 4 in a number of respects. First, a controller 300 controls the feed rate of the additive from the hopper 304 to the transport conduit 308 and various other unit operations via control lines 321a–e. For additive feed rate, the controller 300 can use feed forward and/or feedback control. The feed forward control would be based upon the chemical analysis of the coal being fed from to the furnace. Typically, the chemical analysis would be based on the iron and/or ash content of the coal feed. Feedback control could come from a variety of measured characteristics of boiler operation and downstream components such as: LOI (flue gas $O_2$ and CO with a higher $O_2$ and/or CO concentration indicating less efficient combustion) as measured by an on-line furnace analyzer (not shown), carbon content in ash as determined from ash samples extracted from the flue gas or particle collector (e.g., electrostatic precipitator hopper) (the carbon content is indirectly proportional to combustion efficiency), furnace exit gas temperature (which will decrease with less coal carryover from the cyclones, slag optical characteristics such as emissivity or surface temperature (the above noted additive will desirably reduce emissivity and increase boiler heat transfer), slag tap flow monitoring to assure boiler operability, and stack opacity (a higher stack opacity equates to a less efficient combustion and vice versa). The controller 300 further monitors other boiler performance parameters (e.g., steam temperature and pressure, $NO_2$ emissions, et al., through linkage to a boiler digital control system or DCS. In the event of system malfunction (as determined by a measured parameter falling below or exceeding predetermined threshholds in a look-up table), the controller 300 can forward an alarm signal to the control room and/or automatically shut down one or more unit operations.

The additive is removed from the railcar 200 via flexible hoses 316a,b with camlock fittings 320a,b using a pressured airstream produced by pressure blower 324. The pressurized airstream entrains the additive in the railcar and transports the additive via conduit 328 to the surge hopper 304 and introduced into the hopper in an input port 332 located in a mid-section of the hopper 304.

Compressed air 336 is introduced into a lower section of the hopper 304 via a plurality of air nozzles 340*a–f*. The additive bed (not shown) in the hopper 304 is therefore fluidized and maintained in a state of suspension to prevent the additive from forming a cohesive deposit in the hopper. The bed is therefore fluidized during injection of the additive into the coal feed lines 344*a,b*.

The compressed air 336 can be used to periodically clean the hopper 304 and filter 348 by opening valves 352, 356, and 360 and closing valves 362 and 364.

Filters 366*a,b* are located at the inlet of the blowers 376 and 380 to remove entrained material. Mufflers 368*a,b* and 372*a,b* are located at the inlet and outlet of the blowers 376 and 380 for noise suppression.

Finally, a number of abbreviations in FIG. 5 will be explained. "M" refers to the blower motors and an on/off switch to the motors, "PSH" to an in-line pressure sensor that transmits digital information to the controller 300, "PI" to a visual in-line pressure gauge, "dPS" to a differential pressure switch which transmits a digital signal to the controller indicating the pressure drop across filter receiver 212 (which compares the digital signal to a predetermined maximum desired pressure drop to determine when the filter receiver 212 requires cleaning), "dPI" to a visual differential pressure gauge measuring the pressure drop across the filter receiver 212, "LAH" to an upper level detector that senses when the additive is at a certain (upper) level in the hopper and transmits an alarm signal to the controller 300, "LAL" to a lower level detector that senses when the additive is at a certain (lower) level in the hopper and transmits an alarm signal to the controller 300, and "SV" to a solenoid valve that is actuated by an electrical signal from the controller 300.

EXPERIMENTAL

The slag viscosity of a cyclone furnace was modeled and used to compare the effects of the additive without the additive. The elemental analysis of BOF flue dust was used as the additive. The slag viscosity model showed that the BOF flue dust, when added to the coal to increase the ash iron percentage to 30% by weight (dry basis), increased the thickness of the slag layer in the cyclone by about 60%.

The coal used in the model was based on the specifications for western coal, which is as follows:

Total ash=about 2–15% (dry basis) of the coal
SiO2=about 20–35% (dry basis) of the ash
Al2O3=about 13–20% (dry basis) of the ash
TiO2=about 0–2% (dry basis) of the ash
Fe2O3=about 3–10% (dry basis) of the ash
CaO=about 18–35% (dry basis) of the ash
MgO=about 3–10% (dry basis) of the ash
Na2O=about 0–3% (dry basis) of the ash
K2O=about 0–1% (dry basis) of the ash
SO3/other=about 6–20% (dry basis) of the ash The model also showed that the temperature at which the ash would have a viscosity of 250 poise would be reduced by at least 100° F. The temperature is an important indicator of the minimum temperature at which the slag will flow. If the temperature at which the ash has a viscosity of 250 poise or lower is too high, then the slag will not flow to the slag tap on the floor of the boiler, and the slag will build up inside the boiler casing. This has been a problem on cyclone furnaces burning western coal at less than full design output.

Figure 6:
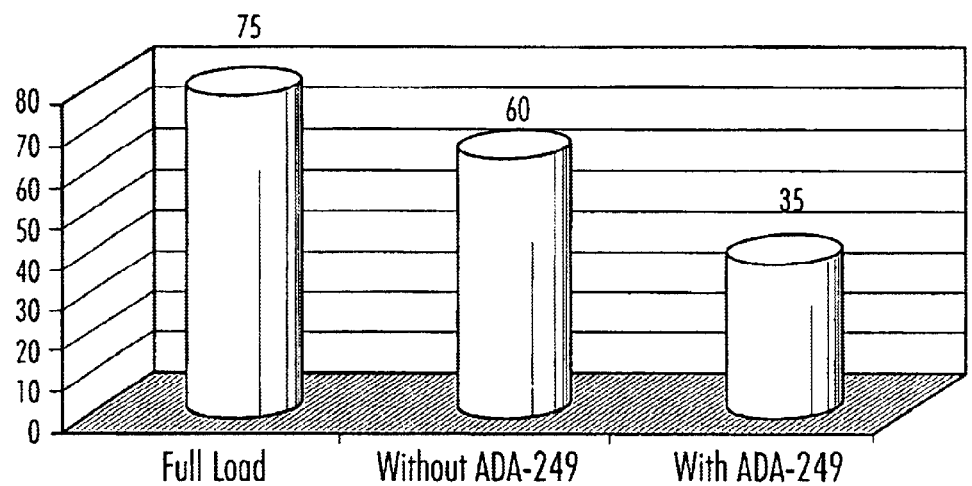
FIG. 6 is a chart of load (vertical axis) versus additive/no additive conditions (horizontal axis)

The first field test of the additive took place at a 75 MW unit in the midwest. A pneumatic storage and injection system was installed at the site, and boiler performance data was obtained during April of 2000. The changes in boiler operation were dramatic as shown in FIG. 6. In FIG. 6, "ADA-249" refers to the additive of the present invention.

Based on FIG. 6 and other experimental information, various observations may be made regarding the performance of ADA-249.

Minimum load was reduced from 75% to 47% of rated capacity when using only about 20 lb. of the additive per ton of coal.

The cost impact on load dispatch was about $200 K/y, not counting the expected increase in unit availability from fewer shutdowns to clean the "monkey hole".

A high-temperature video camera also showed that the main furnace is clear when injecting the additive (meaning that the coal stays in the cyclone to burn) instead of hazy due to unburned fuel when no additive is injected.

The plant confirms that flyash LOI is low and bottom ash is acceptable for high-value sale when the additive is on.

Figure 7:
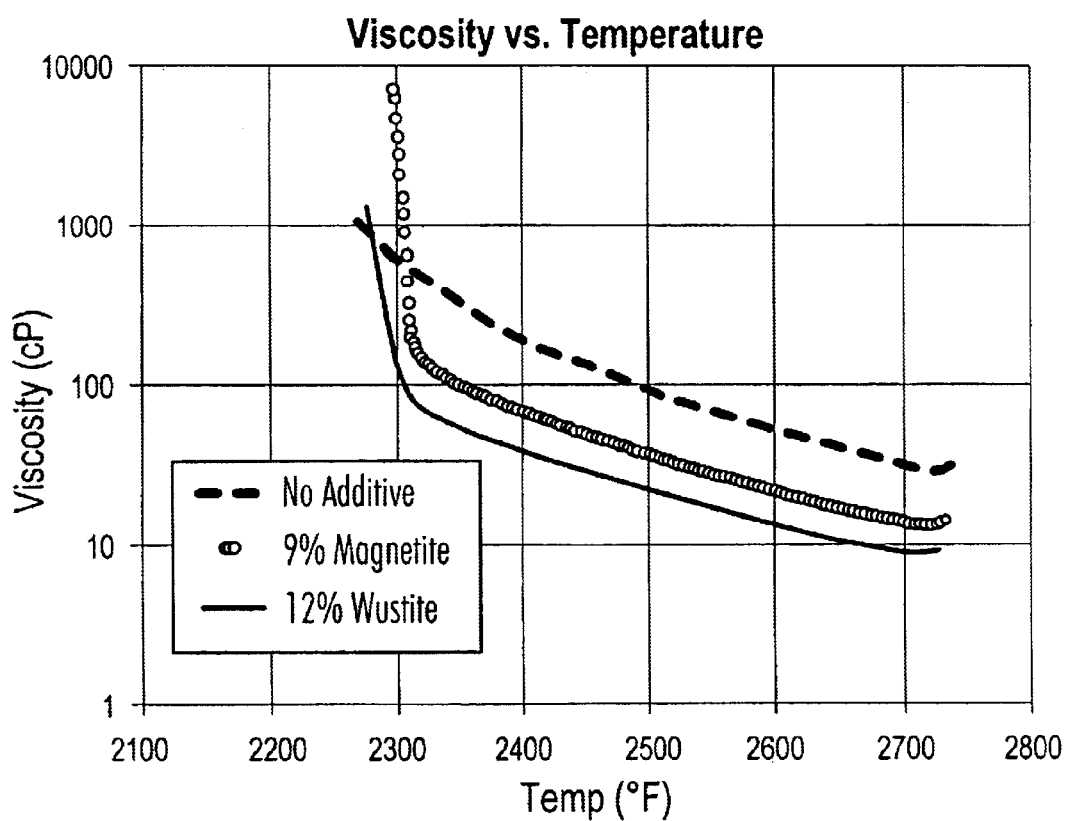
FIG. 7 is a plot of viscosity (Cp) (vertical axis) versus temperature (horizontal axis) for various experiments.

While all iron compounds will flux and thicken the slag layer when burning low-sulfur coals, the effects are improved by incorporating a blend of reduced iron compounds such as Wustite (FeO) and Magnetite ($Fe_3O_4$). FIG. 7 shows this effect. This figure shows temperature and viscosity data for a typical slag alone (shown as "No Additive"), compared to the same slag treated with 9 wt. % (of the slag (dry basis)) magnetite or 12 wt. % (of the slag (dry basis)) wustite at levels to give the same percent iron in the mixture. It can be seen that wustite allows slag flow at a lower temperature. Further, wustite contributes iron crystals to the melt (as indicated by the sharp rise in the curve) at a lower temperature. Wustite is comparatively rare in nature, but is a byproduct of the BOF processes.

Figure 8:
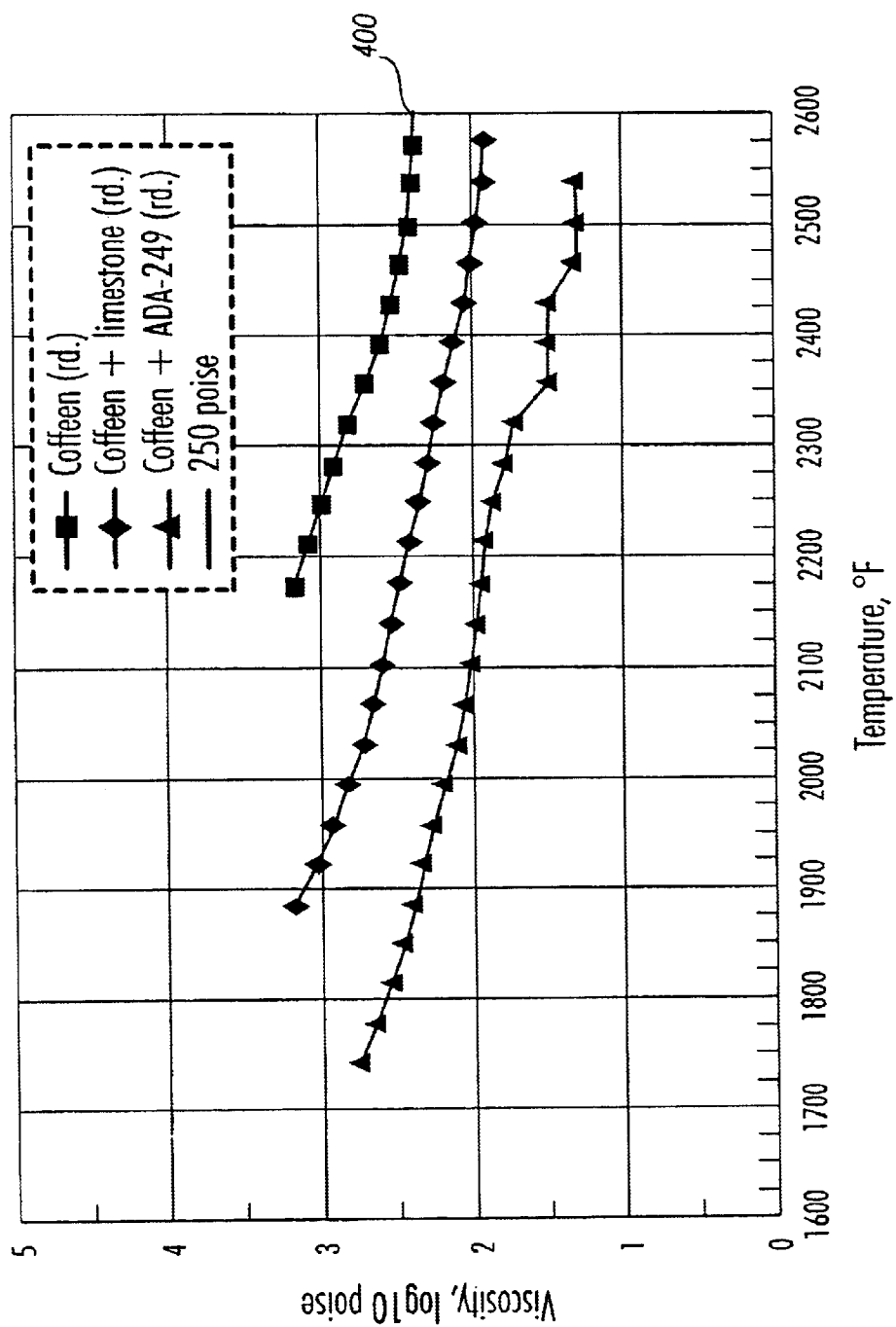
FIG. 8 is a plot of viscosity (Cp) (vertical axis) versus temperature (horizontal axis).

The present invention can also be applied to eastern low-sulfur coals having very high ash melting temperatures. FIG. 8 compares the viscosity-temperature relationships of coal slag alone (shown as "Coffeen (rd.)"), against the same coal slag treated with 2 percent limestone (shown as "Coffeen+limestone (rd.)") or 2 percent of the additive (shown as "Coffeen+ADA-249 (rd.)"). The horizontal line 400 denotes the value of 250 poise. The basis for this comparison is the $T_{250}$, a slag characteristic used by fuel buyers to select the proper coal for cyclone furnaces. This value represents the temperature below which the slag will not flow out of the cyclone combustor.

The slag without additive has a $T_{250}$ of about 2500° F., which is slightly higher than the maximum recommended $T_{250}$ of 2450° F. By adding 2% limestone, the $T_{250}$ can be lowered into the acceptable range (around 2200° F.). However, the same amount of the additive was able to reduce the $T_{250}$ to below 1900° F. Looking at it another way, the $T_{250}$ coal requirement could be satisfied by adding half as much of the additive as limestone. Because of the increased effectiveness of the additive of the present invention, it becomes an economic alternative to limestone for eastern bituminous coals.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A composition, comprising:
   coal particles and
   an additive, comprising:
      an iron-containing compound, wherein the iron is present in an amount of at least about 50 wt. % (dry basis of the additive), wherein at least about 33.5% of the iron is in the form of iron having a valence of +2 or lower, wherein the additive is in the form of a free-flowing particulate and wherein the iron content of the additive ranges from about 50 about 99 wt. % (dry basis of the additive), and further comprising a mineralizer in an amount of at least about 1 wt. % (dry basis of the additive); and
      a fugitive emission inhibitor, wherein the fugitive emission inhibitor is at least one of a grease and oil.

2. The composition of claim 1, wherein the mineralizer is zinc and the zinc content ranges from about 1 to about 8 wt. % (dry basis of the additive), wherein the additive has a $P_{90}$ size of no more than about 300 microns, and further comprising:
   at least one of: (a) a flow aid in an amount of at least about 0.1 wt. % (dry basis of the additive) and (b) an abrasive material in an amount of at least about 1 wt. % (dry basis of the additive).

3. The composition of claim 2, wherein the at least one of a flow aid and an abrasive material is the flow aid.

4. The composition of claim 2, wherein the at least one of a flow aid and an abrasive material is the abrasive material.

5. The composition of claim 1, wherein no more than about 66.5% of the iron in the additive is in the form of ferric iron and wherein the fugitive emission inhibitor is at least oen of a grease and oil.

6. The composition of claim 1, wherein the ratio of ferric iron to ferrous iron is less than 2:1.

7. The composition of claim 1, wherein the ratio of ferric iron to ferrous iron ranges from about 0.1:1 to about 1.95:1.

8. The composition of claim 1, wherein from about 40% to about 65% of the iron is in the form of ferrous iron and wherein the fugitive emission inhibitor is at least one of a grease and oil.

9. The composition of claim 1, wherein the mineralizer content ranges from about 0.5 to about 15 wt. % (dry basis of the additive) and wherein the fugitive emission inhibitor is at least oen of a grease and oil.

10. The composition of claim 1, wherein the mineralizer is zinc and zinc content ranges from about 3 to about 5 wt. % (dry basis of the additive).

11. The composition of claim 1, wherein the additive comprises a fugitive emission inhibitor content in an amount ranging from about 0.1 to about 10 wt. % (dry basis of additive).

12. The composition of claim 1, further comprising water in a ratio of from about 100 parts dry additive to one part water to about 1000 parts dry additive to one part water.

13. The composition of claim 1, further comprising an adhesive.

14. The composition of claim 13, wherein the abrasive content in the additive is about 100 parts additive (in the absence of the adhesive) to one part adhesive to about 1000 parts additive (in the absence of the adhesive) to one part adhesive.

15. The composition of claim 13, wherein the adhesive is at least one of xanthan gum and phosphoric acid.

16. The composition of claim 1, further comprising a dust suppression agent, wherein the content of the agent in the additive ranges from about 1 to about 10 wt. % (dry basis) of the additive.

17. The composition of claim 16, wherein the dust suppression agent is a lignosulfonate.

18. The composition of claim 1, wherein the coal is sub-bituminous.

19. The composition of claim 1, wherein the mineralizer is zinc and zinc content ranges from about 1 to about 8 wt. % (dry basis of the additive).

20. A coal-containing feed material for a furnace, comprising:
    low-sulfur coal; and
    an additive, wherein the additive includes:
       iron in an amount at least about 80 wt. % (dry basis of the additive);
       a mineralizer in an amount of at least about 1 wt. % (dry basis of the additive),
    wherein the coal and additive are entrained in an airstream, and wherein the additive includes wustite.

21. The material of claim 20, wherein the mineralizer content of the additive ranges from about 1 to about 8 wt. % (dry basis of the additive) and wherein the additive is in the form of a free-flowing particulate having a $P_{90}$ size of no more than about 300 microns and wherein the additive further comprises:
    at least one of a flow aid and an abrasive material.

22. The coal-containing feed material of claim 21, wherein the amount of additive ranges from about 10 to about 20 pounds per ton of coal and wherein the at least one of a flow aid and abrasive material is the abrasive material.

23. The coal-containing feed material of claim 21, wherein the $P_{90}$ size of the coal is no more than about 0.25 inch and wherein the at least one of a flow aid and an abrasive material is the flow aid.

24. The material of claim 20, wherein the material comprises at least about 15 wt. % (dry basis of the coal) alkali and no more than about 1.5 wt. % (dry basis of the coal) sulfur.

25. The material of claim 20, wherein the iron is present as an iron-containing compound and wherein the coal includes from about 3 to about 20 wt. % ash (dry basis of the coal.

26. The material of claim 20, wherein the additive comprises a fugitive emission inhibitor content in an amount ranging from about 0.1 to about 10 wt. % (dry basis of the additive) and wherein the coal is sub-bituminous.

27. The material of claim 20, further comprising water in a ratio of from about 100 parts dry additive to one part water to about 1000 parts dry additive to one part water.

28. The material of claim 20, further comprising an adhesive and wherein the adhesive content in the additive is about 100 parts additive (in the absence of the adhesive) to one part adhesive to about 1000 parts additive (in the absence of the adhesive) one part adhesive.

29. The material of claim 28, wherein the adhesive is at least one xanthan gum and phosphoric acid.

30. The material of claim 20, further comprising a dust suppression agent, wherein the content of the agent in the additive ranges from about 1 to about 10 wt. % (dry basis) of the additive.

31. The material of claim 30, wherein the dust suppression agent is a lignosulfonate.

32. The material of claim 20, wherein the additive further includes a fugitive emission inhibitor, wherein the fugitive emission inhibitor is at least one of a grease and oil.

33. The material of claim 20, further comprising water in a ratio of from about 100 parts dry additive to one part water to about 1000 parts dry additive to one part water.

34. The material of claim 20, further comprising an adhesive.

35. The material of claim 20, further comprising a dust suppression agent, wherein the content of the agent in the additive ranges from about 1 to about 10 wt. % (dry basis) of the additive.

36. The material of claim 20, wherein the caol is sub-bituminous.

37. A composition, comprising:
   coal; and
   an additive, comprising:
      an iron-containing compound, the iron being present in an amount of at least about 50 wt. % (dry basis of the additive), and wherein at least about 33.5% of the iron is in the form of iron having a valence of +2 or lower; and
      water in a ratio of from about 100 parts dry additive to one part water to about 1000 parts dry additive to one part water.

38. The composition of claim 37, wherein the additive comprises the flow aid in an amount of at least about 0.1 wt. % (dry basis of the additive) and wherein the additive is in the form of a free-flowing particulate having a $P_{90}$ size of no more than about 300 microns and further comprising:
   at least one of: (a) a flow aid in an amount of at least about 0.1 wt. % (dry basis of the additive) and (b) an abrasive material in an amount of at least about 1 wt. % (dry basis of the additive).

39. The composition of claim 38, wherein the additive comprises the abrasive material in an amount of at least about 1 wt. % (dry basis of the additive).

40. The composition of claim 38, wherein the additive comprises the abrasive material in an amount of at least about 1 wt. % (dry basis of the additive).

41. The material of claim 37, wherein the coal is sub-bituminous.

42. The composition of claim 37, further comprising a fugitive emission inhibitor content in an amount ranging from about 0.1 to about 10 wt. % (dry basis).

43. The composition of claim 37, wherein the iron comprises wustite.

44. The composition of claim 37, further comprising an adhesive and the adhesive is at least one of xanthan gum and phosphoric acid.

45. The material of claim 37, further comprising a dust suppression agent and wherein the dust suppression agent is a lignosulfonate.

46. A composition, comprising:
   coal particles; and
   an additive comprising:
      an iron-containing compound, the iron being present in an amount of at least about 50 wt. % (dry basis of the additive), wherein at least about 33.5% of the iron is in the form of iron having a valence of +2 or lower and wherein the additive is in the form of a free-flowing particulate; and
      a fugitive emission inhibitor that is at least one of a grease and oil.

47. The composition of claim 46, wherein the inhibitor content ranges from about 0.1 to about 10 wt. % (dry basis of the additive).

48. The composition of claim 46, further comprising an adhesive and wherein the adhesive content in the additive is about 100 parts additive (in the absence of the adhesive) to one part adhesive to about 1000 parts additive (in the absence of the adhesive) to one part adhesive.

49. The composition of claim 48, wherein the adhesive is at least one of xanthan gum an phosphoric acid.

50. The composition of claim 46, further comprising a dust suppression agent, wherein the content of the agent in the additive ranges from about 1 to about 10 wt. % (dry basis) of the additive and wherein the coal is sub-bituminous.

51. The composition of claim 50, wherein the dust suppression agent is a lignosulfonate.

52. A composition, comprising:
   coal particles; and
   an additive comprising:
      an iron-containing compound, the iron being present in an amount of at least about 50 wt. % (dry basis of the additive), wherein at least about 33.5% of the iron is in the form of iron having a valence of +2 or lower; and
      water in a ratio of from about 100 parts dry additive to one part water to about 1000 parts dry additive to one part water.

53. The composition of claim 52, wherein the coal particles are subbituminous.

54. The composition of claim 52, wherein no more than about 66.5% of the iron in the additive is in the form of ferric iron.

55. The composition of claim 54, wherein the ratio of ferric iron to ferrous iron is less than 2:1.

56. The composition of claim 52, wherein the additive is in the form of a particulate having a $P_{90}$ size of no more than about 300 microns.

57. The composition of claim 52, wherein the additive comprises a fugitive emission inhibitor content in an amount ranging from about 0.1 to about 10 wt. % (dry basis of the additive).

58. The composition of claim 52, wherein the additive includes wustite.

59. A composition, comprising:
   coal particles; and
   an additive comprising:
      an iron-containing compound, the iron being present in an amount of at least about 50 wt. % (dry basis of the additive), wherein at least about 33.5% of the iron is in the form of iron having a valence of +2 or lower; and
      an adhesive.

60. The composition of claim 59, wherein the adhesive content in the additive is about 100 parts additive (in the absence of the adhesive) to one part adhesive to about 1000 parts additive (in the absence of the adhesive) to one part adhesive and wherein the additive is in the form of a particulate having a $P_{90}$ size of no more than about 3000 microns.

61. The composition of claim 59, wherein the adhesive is at least one of xanthan gum and phosphoric acid.

62. A composition, comprising:
   coal particles; and
   an additive comprising:
      an iron-containing compound, the iron being present in an amount of at least about 50 wt. % (dry basis of the additive), wherein at least about 33.5% of the iron is in the form of iron having a valence of +2 or lower and wherein the additive is in the form of a free-flowing particulate; and
      a dust suppression agent, wherein the content of the agent in the additive ranges from about 1 to about 10 wt. % (dry basis) of the additive.

63. The composition of claim 62, wherein the dust suppression agent is a lignosulfonate.

64. The composition of claim 62, wherein the additive has a $P_{90}$ size of no more than about 300 microns.

65. The composition of claim 62, wherein the coal is sub-bituminous and further comprising:
water in a ratio of from about 100 parts dry additive to one part water to about 1000 parts dry additive to one part water.

66. The composition of claim 62, further comprising an adhesive and wherein the adhesive content in the additive is about 100 parts additive (in the absence of the adhesive) to one part adhesive to about 1000 parts additive (in the absence of the adhesive) to one part adhesive.

67. The composition of claim 66, wherein the adhesive is at least one of xanthan gum and phosphoric acid.

68. The composition of claim 62, further comprising wherein the additive comprises a fugitive emission inhibitor content in an amount ranging from about 0.1 to about 10 wt. % (dry basis of the additive).

69. The composition of claim 62, further comprising:
water in a ratio of from about 100 parts dry additive to one part water to about 1000 parts dry additive to one part water.

70. The composition of claim 62, wherein the additive includeswustite.

71. The composition of claim 62, further comprising an adhesive and wherein the adhesive content in the additive is about 100 parts additive (in the absence of the adhesive) to one part adhesive to about 1000 parts additive (in the absence of the adhesive) to one part adhesive.

72. The composition of claim 71, wherein the adhesive is at least one of xanthan gum and phosphoric acid.

73. A composition, comprising:
coal particles and
an iron-containing compound, the iron being present in an amount of at least about 50 wt. % (dry basis of the additive), wherein at least about 33.5% of the iron is in the form of iron having a valence of +2 or lower, wherein the additive is in the form of a free-flowing particulate, and wherein the iron content ranges from about 50 to about 99 wt. % (dry basis of the additive) amd further comprising a mineralizer in an amount of at least about 1 wt. % (dry basis of the additive) and a fugitive emission inhibitor that is at least one of a grease and oil.

74. The composition of claim 73, wherein the inhibitor content ranges from about 0.1 to about 10 wt. % (dry basis of the additive) and wherein the additive has a $P_{90}$ size of no more than about 300 microns.

75. A composition, comprising:
coal particles and
an iron-containing compound, the iron being present in an amount of at least about 50 wt. % (dry basis of the additive), wherein at least about 33.5% of the iron is in the form of iron having a valence of +2 or lower, wherein the iron content ranges from about 50 to about 99 wt. % (dry basis of the additive) and further comprising a mineralizer in an amount of at least about 1 wt. % (dry basis of the additive) adn an adhesive.

76. The composition of claim 75, wherein the adhesive content in the additive is about 100 parts additive (in the absence of the adhesive) to one part adhesive and wherein the additive is in the form of a particulate having a $P_{90}$ size of no more than about 300 microns.

77. The composition of claim 75, wherein the adhesive is at least one of xanthan gum and phosphoric acid.

78. A composition, comprising:
coal particles and
an iron-containing compound, the iron being present in an amount of at least about 50 wt. % (dry basis of the additive), wherein at least about 33.5% of the iron is in the form of iron having a valence of +2 or lower, and wherein the iron content ranges from about 50 to about 99 wt. % (dry basis of the additive) and further comprising a mineralizer in an amount of at least about 1 wt. % (dry basis of the additive) and a dust suppression agent, wherein the content of the agent in the additive ranges from about 1 to about 10 wt. % (dry basis) of the additive.

79. The composition of claim 78, wherein the dust suppression agent is a lignosulfonate and wherein the additive is in the form of a free-flowing particulate having a $P_{90}$ size of no more than about 300 .

80. A coal-containing feed material for a furnace, comprising:
low sulfur coal; and
an additive, wherein the additive includes:
iron in an amount of from about 70 to about 90 wt. % (dry basis of the additive);
a mineralizer in an amount of at least about 1 wt. % (dry basis of the additive),
wherein the coal and additive are entrained in an airstream, and wherein the additive includes wustite.

81. The material of claim 80, wherein the additive further includes a fugitive emission inhibitor, wherein the fugitive emission inhibitor is at least one of a grease and oil.

82. The material of claim 80, further comprising water in a ratio of from about 100 parts dry additive to one part water to about 1000 parts dry additive to one part water.

83. The material of claim 80, further comprising an adhesive.

84. The material of claim 80, further comprising a dust suppression agent, wherein the content of the agent in the additive ranges from about 1 to about 10 wt. % (dry basis) of the additive.

85. The material of claim 80, wherein the iron is present as iron-containing compound and wherein the coal is sub-bituminous.

* * * * *